United States Patent
Kim et al.

(10) Patent No.: US 9,577,777 B2
(45) Date of Patent: Feb. 21, 2017

(54) METHOD AND APPARATUS FOR CONTROLLING INTER-CELLULAR INTERFERENCE IN HETNET SYSTEM

(71) Applicants: LG ELECTRONICS INC., Seoul (KR); RESEARCH & BUSINESS FOUNDATION SUNGKYUNKWAN UNIVERSITY, Suwon-si, Gyeonggi-do (KR)

(72) Inventors: Hakseong Kim, Anyang-si (KR); Mochan Yang, Seoul (KR); Erang Lim, Seoul (KR); Shanai Wu, Seoul (KR); Ohsoon Shin, Seoul (KR); Yoan Shin, Seoul (KR)

(73) Assignees: LG ELECTRONICS INC., Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 109 days.

(21) Appl. No.: 14/412,159

(22) PCT Filed: Dec. 28, 2012

(86) PCT No.: PCT/KR2012/011815
§ 371 (c)(1),
(2) Date: Dec. 30, 2014

(87) PCT Pub. No.: WO2014/007445
PCT Pub. Date: Jan. 9, 2014

(65) Prior Publication Data
US 2015/0180601 A1    Jun. 25, 2015

Related U.S. Application Data

(60) Provisional application No. 61/666,940, filed on Jul. 2, 2012.

(51) Int. Cl.
H04J 11/00 (2006.01)
H04W 72/04 (2009.01)
H04W 72/08 (2009.01)

(52) U.S. Cl.
CPC ........ *H04J 11/0056* (2013.01); *H04W 72/042* (2013.01); *H04W 72/082* (2013.01)

(58) Field of Classification Search
CPC .. H04W 48/12; H04W 72/082; H04W 72/042; H04W 76/023; H04W 72/1278; H04W 72/0413; H04W 72/0406; H04W 72/04; H04J 11/0023; H04J 11/0056; H04J 11/005

(Continued)

(56) References Cited

U.S. PATENT DOCUMENTS 8,914,055 B2 * 12/2014 Dimou ............... H04W 72/082 370/260
2010/0093364 A1 * 4/2010 Ribeiro ............... H04W 72/082 455/452.2

(Continued)

FOREIGN PATENT DOCUMENTS

| KR | 10-2011-0046231 A | 5/2011 |
| KR | 10-2012-0050456 A | 5/2012 |
| WO | WO 2011/074865 A2 | 6/2011 |

OTHER PUBLICATIONS

3GPP, "3rd Generation Partnership Project; Technical Specification Group Radio Access Network; Evolved Universal Terrestrial Radio Access (E-UTRA); Mobility Enhancements in Heterogeneous Networks (Release 11)", 3GPP TR 36.839, V0.5.0, Feb. 2012, pp. 1-28.

(Continued)

*Primary Examiner* — Kwang B Yao
*Assistant Examiner* — Syed M Bokhari
(74) *Attorney, Agent, or Firm* — Birch, Stewart, Kolasch & Birch, LLP

(57) ABSTRACT

Provided is a method and an apparatus for controlling inter-cellular interference in a heterogeneous network (Het- Net) system, in which a macro cell and femto cells coexist. The apparatus for controlling inter-cellular interference overbears a control channel of the macro cell. The control apparatus determines an interference candidate resource, which is subject to inter-cell interference control, on the basis of the control channel. The control apparatus transmits an interference control message including information on the interference candidate resource.

6 Claims, 14 Drawing Sheets

(58) Field of Classification Search
USPC .................. 370/329, 252; 455/517, 452.2
See application file for complete search history.

(56) References Cited

U.S. PATENT DOCUMENTS

| 2012/0057484 A1* | 3/2012 | Wan ............... H04L 1/0026 370/252 |
| 2012/0201162 A1* | 8/2012 | Kim ............... H04B 17/345 370/252 |
| 2012/0243431 A1* | 9/2012 | Chen ............... H04W 72/0406 370/252 |

OTHER PUBLICATIONS

Yang et al., "A Shared Relay-Assisted Interference Avoidance for D2D Communications in Cellular Networks", In: Korea Institute of Communication and Information Sciences, Summer Conference, Jun. 21, 2012, 5 Sheets.

\* cited by examiner

METHOD AND APPARATUS FOR CONTROLLING INTER-CELLULAR INTERFERENCE IN HETNET SYSTEM

CROSS REFERENCE TO RELATED APPLICATIONS

This application is the National Phase of PCT International Application No. PCT/KR2012/011815, filed on Dec. 28, 2012, which claims priority under 35 U.S.C. 119(e) to U.S. Provisional Application No. 61/666,940, filed on Jul. 2, 2012, all of which are hereby expressly incorporated by reference into the present application.

BACKGROUND OF THE INVENTION

Field of the Invention

The present invention relates to wireless communications and, more particularly, to a method and apparatus for controlling inter-cell interference in a heterogeneous network (HetNet) system.

Related Art

In 3rd generation partnership project (3GPP) long term evolution (LTE)—Advanced, a small cell such as a femto cell or a pico cell is introduced to meet the traffic requirement for wireless data which are abruptly increased.

In addition, various situations causing interferences due to the coexistence of a macro base station which is a large base station and the femto base station and the pico base station which are small base stations in a cell are organized, and researches for solving it have been vigorously progressed.

SUMMARY OF THE INVENTION

The technical object of the present invention is to provide a method for controlling interference and an apparatus using the same which can manage the inter-cell interference between a macro cell and a small cell and increase the frequency efficiency.

Another technical object of the present invention is to provide a method for controlling inter-cell interference (ICI) and an apparatus using the same which is assisted by the cluster coordinator node (CCN).

Still another technical object of the present invention is to provide a method for controlling the ICI of a macro user equipment (UE) which is existed in the coverage of a small base station and an apparatus using the same.

In an aspect, a method for controlling inter-cell interference in a heterogeneous network (HetNet) system where a macro cell and a femto cell coexist is provided. The method includes overhearing a control channel of the macro cell, determining a interference candidate resource which is an object of the inter-cell interference control based on the control channel, and transmitting an interference control message that includes information of the interference candidate resource.

The method may further include determining an interference candidate user equipment which is the object of the inter-cell interference control among user equipments which are located in the femto cell.

The control channel may be a downlink control channel transmitted from a macro base station to a user equipment or an uplink control channel transmitted from a user equipment to a macro base station.

Determining the interference candidate resource may include checking downlink channel state of the user equipment by decoding the unlink control channel.

In another aspect, an apparatus for controlling inter-cell interference in a heterogeneous network (HetNet) system where a macro cell and a femto cell coexist is provided. The apparatus includes a radio frequency (RF) unit configured to transmit and receive a radio signal, and a processor operatively coupled with the RF unit. The processor is configured to overhear a control channel of the macro cell, determine a interference candidate resource which is an object of the inter-cell interference control based on the control channel, and transmit an interference control message that includes information of the interference candidate resource.

In the heterogeneous network (HetNet) system where a macro cell and a small cell coexist, the quality of service (QoS) of a macro user equipment (UE) can be guaranteed.

DESCRIPTION OF EXEMPLARY EMBODIMENTS

Hereinafter, the embodiments of the present invention will be described in detail with reference to the accompanying drawings.

Figure 1:
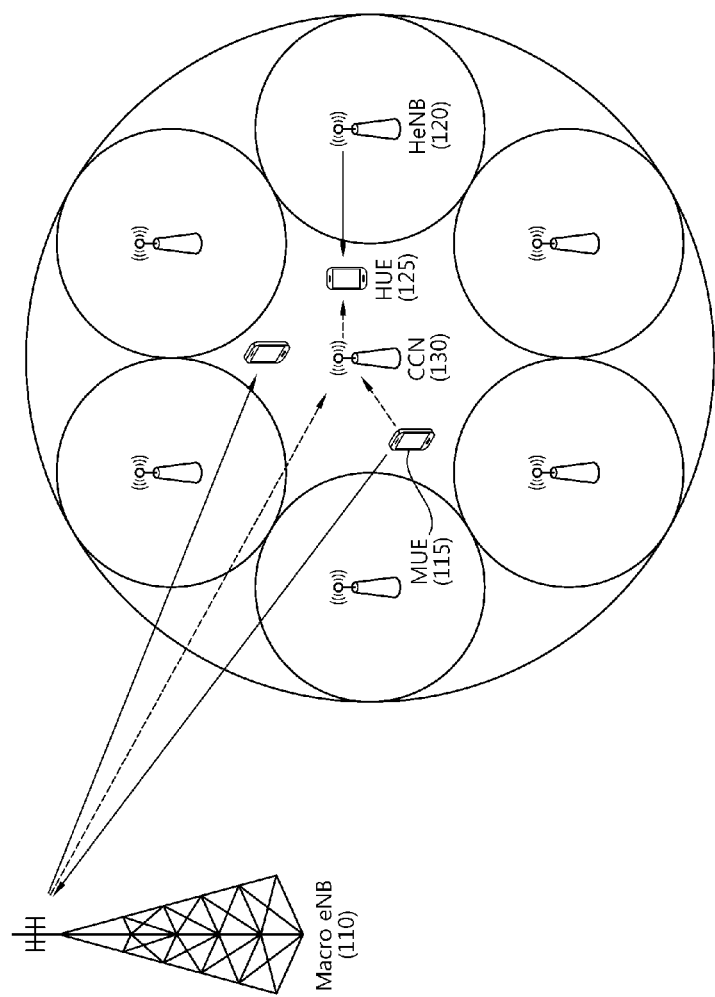
FIG. 1 illustrates an example of a heterogeneous network (HetNet) system to which the present invention is applied.

FIG. 1 illustrates an example of a heterogeneous network (HetNet) system to which the present invention is applied.

Referring to FIG. 1, the HetNet system includes at least one enhanced Node-B (eNB). The eNB provides services for a specific geographic area (generally, referred to as a cell). A user equipment (UE) may be fixed or mobile, and may be referred to as another terminology, such as a mobile station (MS), a mobile terminal (MT), a user terminal (UT), a subscriber station (SS), a wireless device, etc.

The eNB is generally a fixed station that communicates with the UE and may be referred to as another terminology, such as a base station (BS), a base transceiver system (BTS), an access point (AP), etc.

The eNB may be classified as a macro eNB, a femto eNB, a pico eNB, etc. according to the service coverage. Generally, the macro eNB 110 is classified as a large eNB and the femto eNB and the pico eNB are classified as a small eNB. Also, the femto eNB and the pico eNB may be called a Home eNB (HeNB).

The UE commonly belongs to a cell, the cell to which the UE belongs is called a serving cell. The eNB that provides communication services for the serving cell is referred to as a serving eNB. In the example of FIG. 1, the serving eNB of the macro UE (MUE) 115 is the macro eNB 110, and the serving eNB of the Home UE (HUE) 125 is the HeNB 120.

In general, downlink means the communication from the eNB to the UE, and uplink means the communication from the UE to the eNB. The transmitter in downlink may be a part of the eNB, and the receiver may be a part of the UE. In uplink, the transmitter may be a part of the UE, and the receiver may be a part of the eNB.

Referring to FIG. 1, in the HetNet system where a macro cell and multiple small cells coexist, the multiple small cells may share one cluster coordinator node (CCN) 130. The CCN is located in a center part of the multiple small cells, and controls the inter-cell interference (ICI) that occurs between the macro cell and the small cell.

The CCN 130 may overhear the downlink signal transmitted from the eNB 110 and/or the uplink signal transmitted from the MUE 115 and check how the radio resources are allocated to the MUE 115.

To overhear is to open the signal which is not targeted, for example, means that the CCN listens to the signal transmitted from the macro eNB to the MUE. In order to open the signal which is not targeted, the CCN should decode the control channel of UE to overhear. For this, an identifier (ID) of the corresponding UE, an authority and/or authentication for the corresponding UE may be required.

Subsequently, for the convenience of description, the femto cell among the small cell will be exemplified. However, the inventive concept of the present invention is not limited thereto. The inventive concept of the present invention may also be easily applied to the pico cell or a device-to-device (D2D) communication. Also, the fractional frequency reuse (FFR) in the small cell is assumed to be 1.

Meanwhile, in order to control the inter-cell interference between the macro cell and the femto-cell, the functions below may be required.

1. In case that there are multiple femto cells in the HetNet system, the CCN performs the role of managing the interference between the macro cell and the femto cell.

2. The CCN may have a separate cell ID according to the characteristics of nodes. In case that the CCN has a cell ID, the CCN may generate a cell which is separated from the macro cell.

3. The CCN may transmit the dedicated control signal to each cell.

4. The UE is not able to detect the presence of CCN. That is, the CCN is transparent to the UE.

5. Separate wired/wireless interfaces may be defined in order for the CCN to transmit the control signal. In case that the wireless interface is defined, a dedicated channel may be allocated to transmit the control signal.

6. Though the CCN may transmit the control signal to the eNB, the CCN is unable to transmit the control signal to the UE.

7. The CCN may manage multiple small cells, and forms a small cell group as a unit of cluster.

8. The CCN may overhear the control signal which is transmitted from the eNB and the UE. The control signal is decoded and used for controlling the ICI.

It is preferable that all conditions described above are satisfied, but not all of the conditions should be satisfied. That is, the conditions described above are not necessary conditions, but may be selectively considered.

Figure 2:
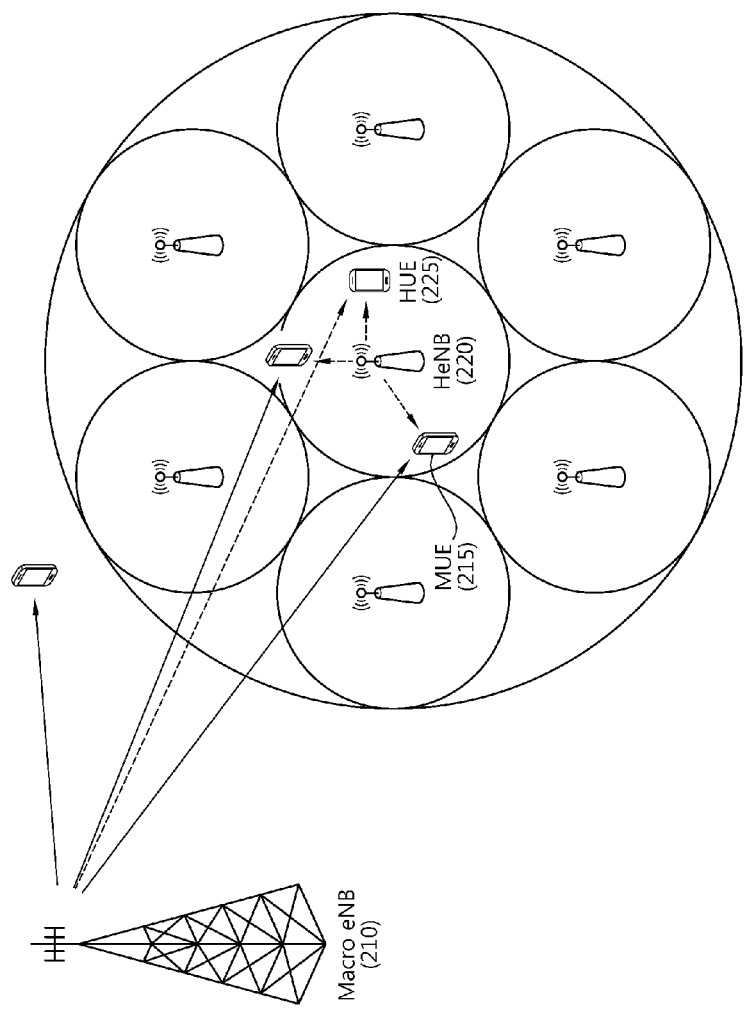
FIGS. 2 and 3 illustrate an example in which the inter-cell interference (ICI) occurs in the HetNet system.
Figure 3:
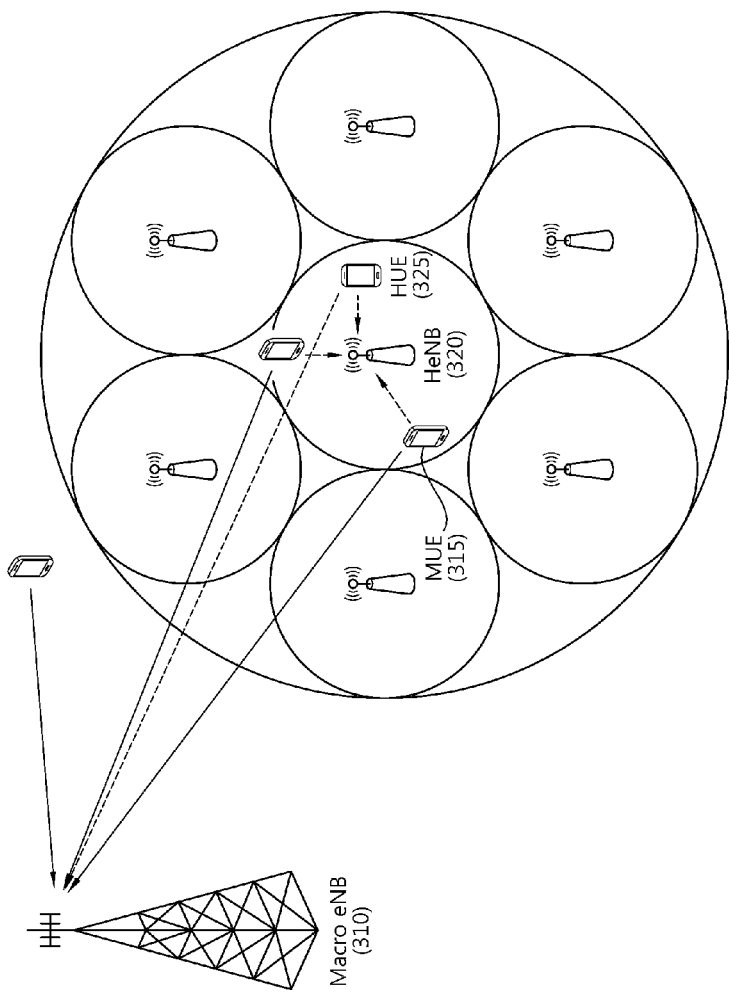

FIGS. 2 and 3 illustrate an example in which the inter-cell interference (ICI) occurs in the HetNet system.

FIG. 2 illustrates that the ICI occurs between the macro cell and the femto cell in downlink. Referring to FIG. 2, in case that the link from a macro eNB 210 to a MUE 215 and the link from a HeNB 220 to a HUE 225 are co-channel deployment, that is, in case of using the same radio resource, the ICI may occur.

FIG. 3 illustrates that the ICI occurs between the macro cell and the femto cell in uplink. The same manner as the downlink, the link from a MUE 315 to a macro eNB 310 and the link from a HUE 325 to a HeNB 320 uses the same radio resource in the neighboring region, the ICI may occur.

Figure 4:
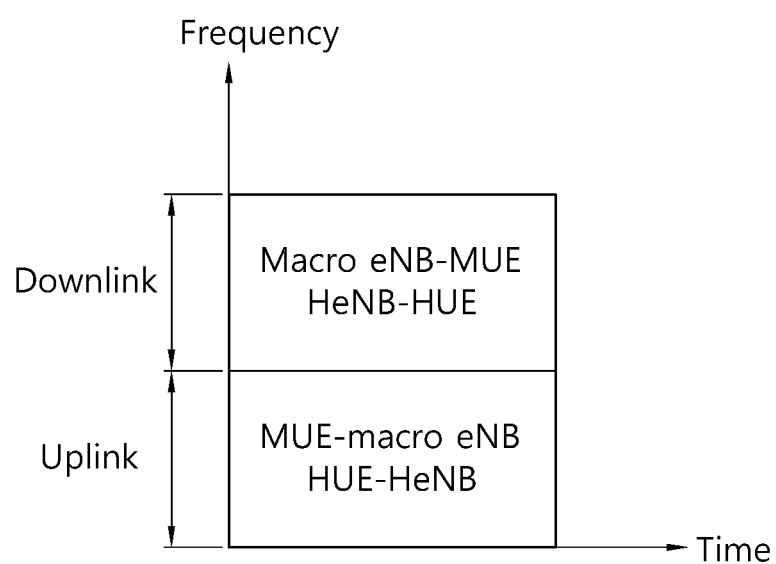
FIG. 4 illustrates an example of dynamic resource allocation in the HetNet system.

FIG. 4 illustrates an example of dynamic resource allocation in the HetNet system.

In case that the resources are allocated by frequency division duplexing (FDD), according to general FDD, all of the downlink and uplink exist in the same time-domain, and the downlink and uplink may be distinguished in the frequency-domain.

Meanwhile, in the HetNet system, due to the frequency reuse of the femto cell, the link between the macro eNB and the MUE and the link between the HeNB and the HUE may exist in the same frequency resource. Accordingly, the interference among the same channel may occur.

Figure 5:
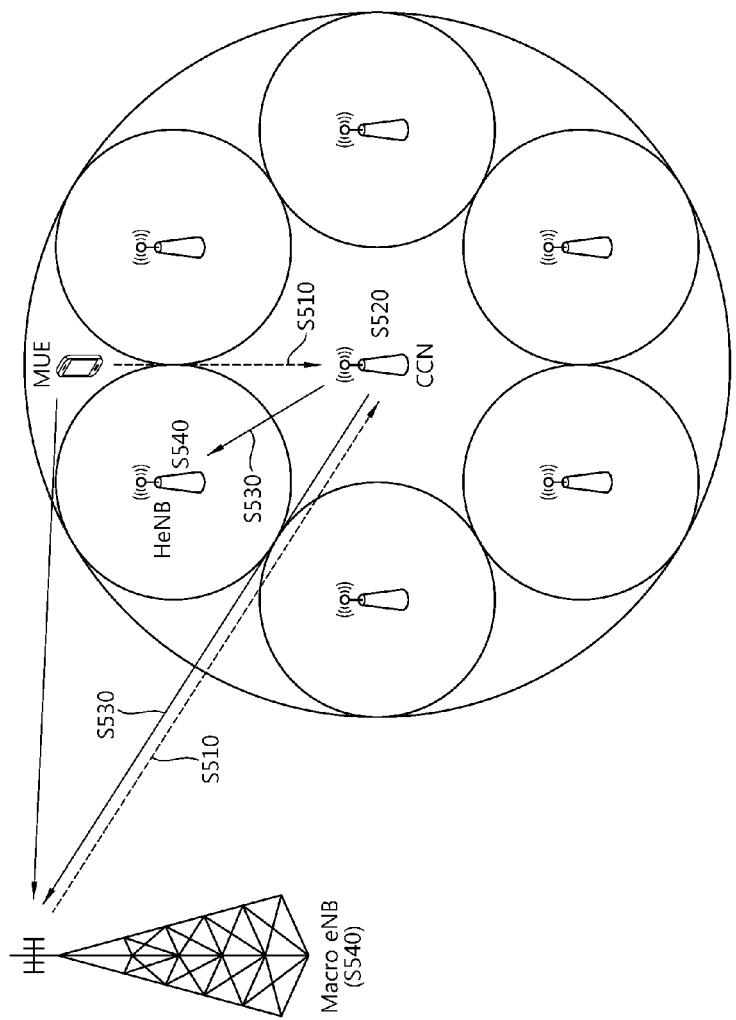
FIG. 5 illustrates a method for controlling the ICI in the HetNet system according to the present invention.

FIG. 5 illustrates a method for controlling the ICI in the HetNet system according to the present invention.

Referring to FIG. 5, the CCN may be arranged around at least one femto cell where the ICE may occur. In case that the femto cells are multiple, the multiple femto cell may share one CCN, and the CCN may be located at the center of the multiple femto cells.

The CCN overhears the control signal transmitted from the macro eNB to the MUE and/or the uplink signal transmitted from the MUE (step, S510). The control signal may be a signal transmitted through the physical downlink control channel (PDCCH), and the uplink signal may be a signal transmitted through the physical uplink shared channel (PUSCH).

The CCN performs a series of processes to control the ICI based on the signal overheard (step, S520). The detailed description for the series of processes will be described below.

The CCN transmits the message for controlling the ICI to the macro eNB and/or a specific HeNB (step, S530). The message may include the current channel state, the information of whether the collision occurs in the allocated resource, the opposition/prohibition command for a specific resource, and so on. The message may be transmitted by broadcast way.

The macro eNB and/or the HeNB that receive(s) the message for controlling the ICI perform(s) the resource allocation based on the message (step, S540).

Meanwhile, the communication of macro cell is prior to the communication of femto cell, pico cell or D2D in policy, and generally, the resource management of small cell is easier and more flexible than that of large cell. Accordingly, it is preferable that the CCN transmits the message for controlling the ICI to the HeNB, and allocates resources to the HUE based on the message.

Hereinafter, the method for controlling the ICI in the HetNet system according to the present invention will be described by dividing into [1] the method of allocating resources with adaptive and fixed way and [2] the method of allocating resources with adaptive and dynamic way.

Figure 6:
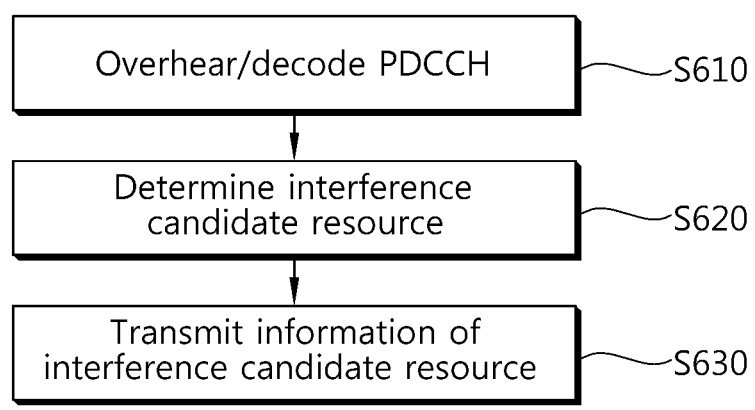
FIG. 6 illustrates a method of controlling ICI (adaptive and fixed resource allocation) in the HetNet system according to an embodiment of the present invention.

FIG. 6 illustrates a method of controlling ICI (adaptive and fixed resource allocation) in the HetNet system according to an embodiment of the present invention.

A CCN overhears the PDCCH transmitted from a macro eNB to a MUE (step, S610). The CCN may have an ID of the corresponding MUE to decode the PDCCH, and the decoded PDCCH may be stored and recorded in a buffer.

Meanwhile, the CCN may control the ICI for all MUE which are located around, but may control the ICI for only a specific MUE. That is, the CCN may determine the MUE which needs the ICI control among the MUEs that are located around and control the ICI only for the corresponding MUE. For example, the CCN may overhear the uplink signal of the MUE and based on this, determine whether to control the ICI for the corresponding MUE. When defining the MUE requiring the ICI control to be S, and the MUE not requiring the ICI control to be T, the S and T are represented by Equation 1.

$$S = \{MUE | \gamma_{MUE} > \Gamma\}$$

$$T = \{MUE | S^C\} \quad \text{[Equation 1]}$$

Here, $\gamma_{MUE}$ is the power of uplink signal which is overheard by the CCN, and $\Gamma$ is a predetermined threshold value. Referring to Equation 1, in case that the received power of the uplink signal of the MUE is greater than the threshold value, the CCN determine the corresponding MUE to be MUE S in which the ICI control is required. The fact that the power of uplink signal is great may mean that the corresponding MUE is located near to the CCN or the channel state between the corresponding MUE and the macro eNB is not good. Accordingly, the CCN may determine whether to perform the ICI control for the corresponding MUE by overhearing the uplink signal of MUE.

Meanwhile, the CCN may acquire the information of downlink and uplink resources which are allocated to the MUE through decoding the PDCCH. The CCN determines the resources in which the ICI may occur to be an interference candidate resource based on the information acquired (step, S620). For example, the CCN may determine the resource allocated to the MUE that requires the ICI control to be the interference candidate resource.

The CCN transmits the information of the interference candidate resource to the macro eNB and/or the HeNB (step, S630). For example, the CCN may transmit the index of interference candidate resource.

The macro eNB that receives the information allocates the resource to the corresponding MUE with fixed manner. However, the macro eNB newly performs the resource allocation to the corresponding MUE in the following cases.

[1] The case that the transmitted signal of the corresponding MUE does not satisfy the signal to interference-plus-noise ratio (SINR) for guaranteeing the quality of service (QoS).

[2] The case that the corresponding MUE does not require the resource allocation scheduling (in this case, the resource allocated to the corresponding MUE is released).

The conditions described above are exemplary, and in case that it is required to newly perform the resource allocation, the macro eNB may perform the resource allocation dynamically according to the scheduling such as a round robin (RR) and a proportional fairness (PF).

The CCN updates the information of the resource in which the ICI is continuously occurred by repeating the above processes. In case that there are changes in the resource allocated to the MUE that requires the ICI control, the CCN may notify the changes to the macro eNB and/or the HeNB.

Figure 7:
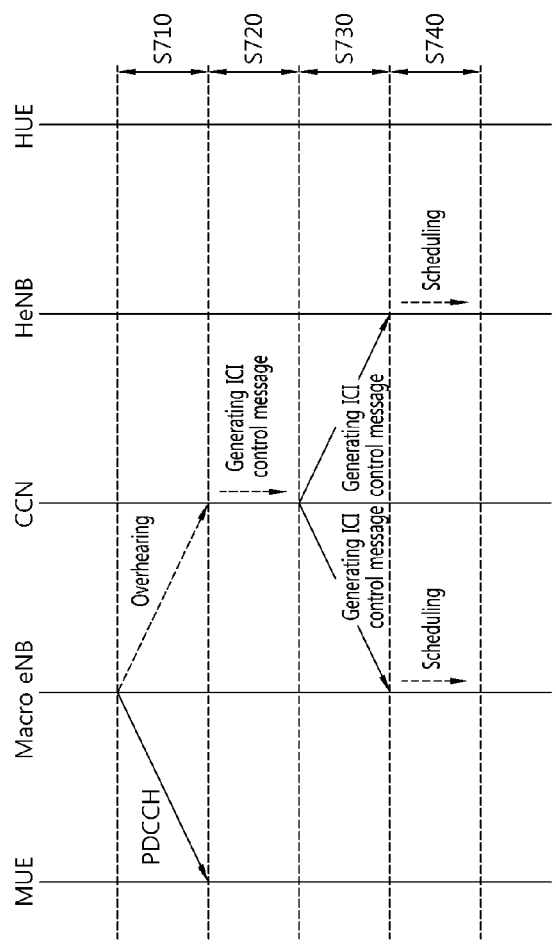
FIG. 7 is an example illustrating the flow of signal for each entity in the embodiment of FIG. 6.

FIG. 7 is an example illustrating the flow of signal for each entity in the embodiment of FIG. 6.

In briefly describing FIG. 7, a CCN overhears the PDCCH transmitted from a macro eNB to a MUE (step, S710).

The CCN acquires the information of the resource allocated to the MUE by decoding the PDCCH, and generates the interference control message based on the information acquired (step, S720). The interference control message may include the current channel state, the information of whether the collision occurs in the allocated resource, the opposition/prohibition command for a specific resource, the information of the resource in which the ICI may occur, and so on.

The CCN transmits the interference control message to the macro eNB and/or the HeNB (step, S730).

Based on this, the macro eNB and/or the HeNB allocate(s) the resource, and perform(s) the communication with the UE using the resource allocated (step, S740).

Steps S710 to S740 are recursively performed, and the detailed description will be omitted since it is the same as the description with reference to FIG. 6.

Meanwhile, the resource allocation in the process described above includes the resource allocation in both uplink and downlink. That is, the resource allocation method of adaptive and fixed way may be applied to both uplink and downlink.

Figure 8:
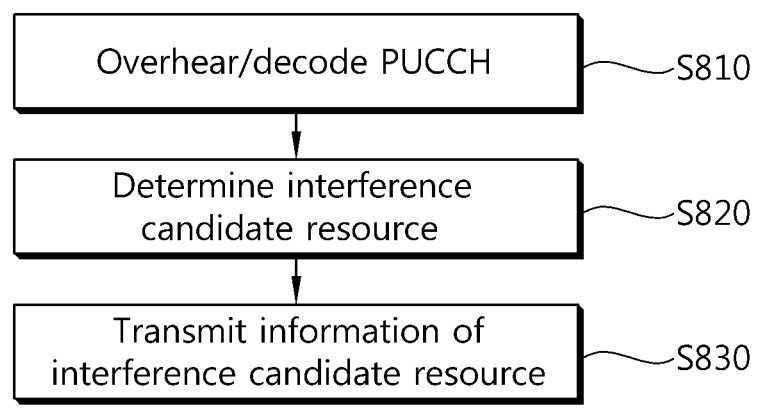
FIG. 8 illustrates a method (the resource allocation of adaptive and dynamic) of controlling the ICI in the HetNet system according to an embodiment of the present invention.

FIG. 8 illustrates a method (the resource allocation of adaptive and dynamic) of controlling the ICI in the HetNet system according to an embodiment of the present invention.

A CCN overhears the PUCCH which is transmitted from a UE to an eNB, and decodes the PUCCH (step, S810). In this time, it is preferable that the overhearing for the uplink such as the PUCCH is performed only for a MUE. This is because it is hard for a HUE to form a link due to the limit on the distance between the HUE and the CCN. That is, it is preferable that the CCN overhears the PUCCH which is transmitted from the MUE to the macro eNB.

Meanwhile, the CCN may control the ICI for all MUEs which are located around, but control the ICI only for a specific MUE For example, the CCN may determine the MUE for which the ICI control is required among the MUE located around, and control the ICI only for the corresponding MUE. For this, the CCN may overhear the uplink signal of MUE, and based on this, determine whether to perform the ICI control for the corresponding MUE.

The CCN may acquire the information of the channel state and the scheduling requirement of downlink through the PUCCH decoding. The CCN determines the resource in which the ICI may occur to be an interference candidate resource based on the information acquired (step, S820). For example, the CCN may determine the resource allocated to the MUE that requires the ICI control to be the interference candidate resource. Otherwise, the CCN may determine the resource in which the channel state of downlink is not good to be the interference candidate resource.

The CCN transmits the information of the interference candidate resource to the macro eNB and/or the HeNB (step, S830). For example, the CCN may transmit the index of the interference candidate resource.

The macro eNB that receives the information fixedly allocates the resource to the corresponding MUE, and the HeNB may not use the corresponding resource.

Figure 9:
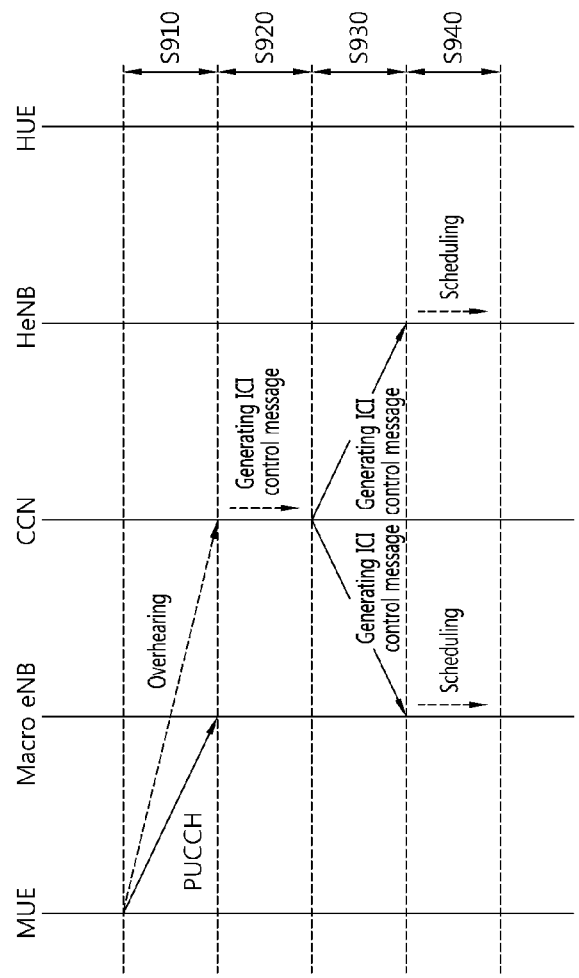
FIG. 9 is an example illustrating the flow of signal for each entity in the embodiment of FIG. 8.

FIG. 9 is an example illustrating the flow of signal for each entity in the embodiment of FIG. 8.

In briefly describing FIG. 9, a CCN overhears the PUCCH transmitted from a MUE to a macro eNB (step, S910).

The CCN acquires the information of the channel state and the scheduling requirement of downlink by decoding the PUCCH, and generates the interference control message based on the information acquired (step, S920).

The interference control message may include the current channel state, the information of whether the collision occurs in the allocated resource, the opposition/prohibition command for a specific resource, the information of the resource in which the ICI may occur, and so on.

The CCN transmits the interference control message to the macro eNB and/or the HeNB (step, S930).

Based on this, the macro eNB and/or the HeNB allocate(s) the resource, and perform(s) the communication with the UE using the resource allocated (step, S940).

Steps S910 to S940 are recursively performed, and the detailed description will be omitted since it is the same as the description with reference to FIG. 8. Through the process described above, the downlink resource may be dynamically allocated.

Figure 10:
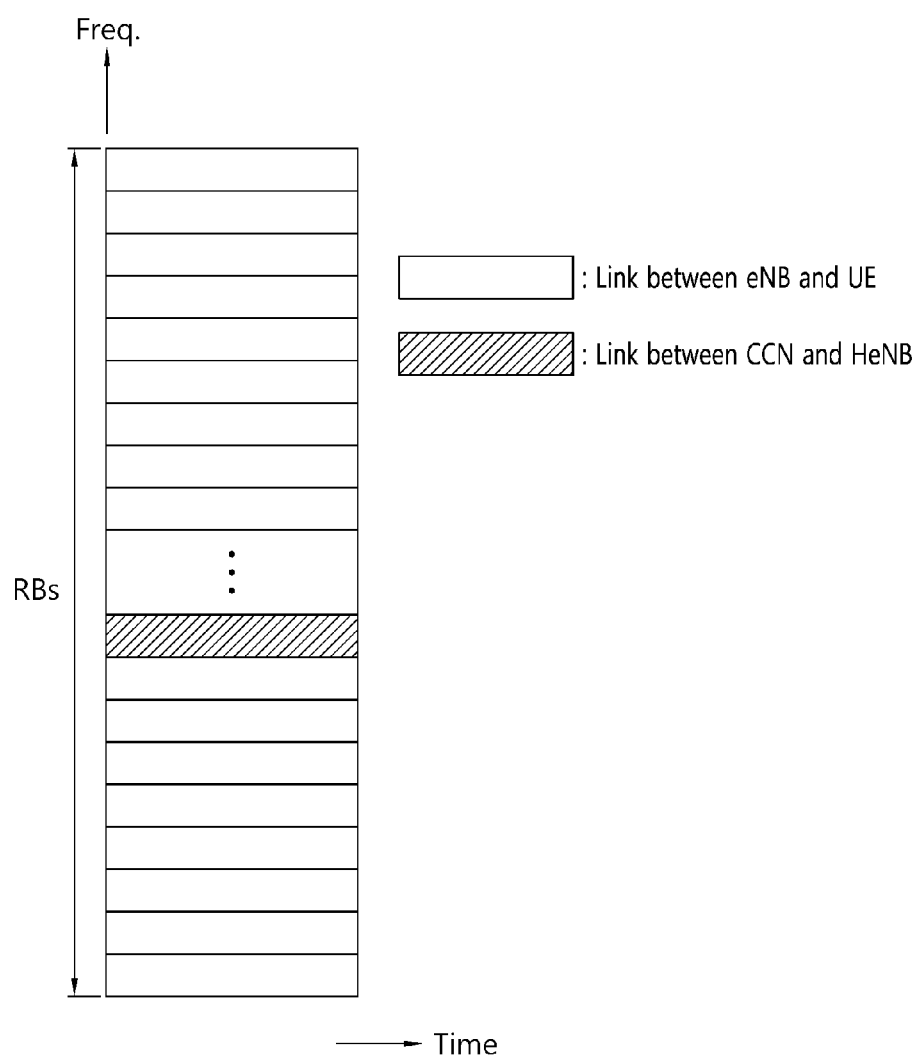
FIG. 10 illustrates the dynamic resource allocation in the HetNet system according to an embodiment of the present invention.

FIG. 10 illustrates the dynamic resource allocation in the HetNet system according to an embodiment of the present invention.

If the partial frequency reuse is 1, a macro eNB and a HeNB of the HetNet system may dynamically allocate all resource blocks (RBs) using various scheduling method such as the RR, the PF, and the Max carrier to interference and noise ratio (CINR).

Also, if the link between a CCN and the HeNB is allocated as the dedicated channel, the resource block may not be overlapped as shown in FIG. 10.

Figure 11:
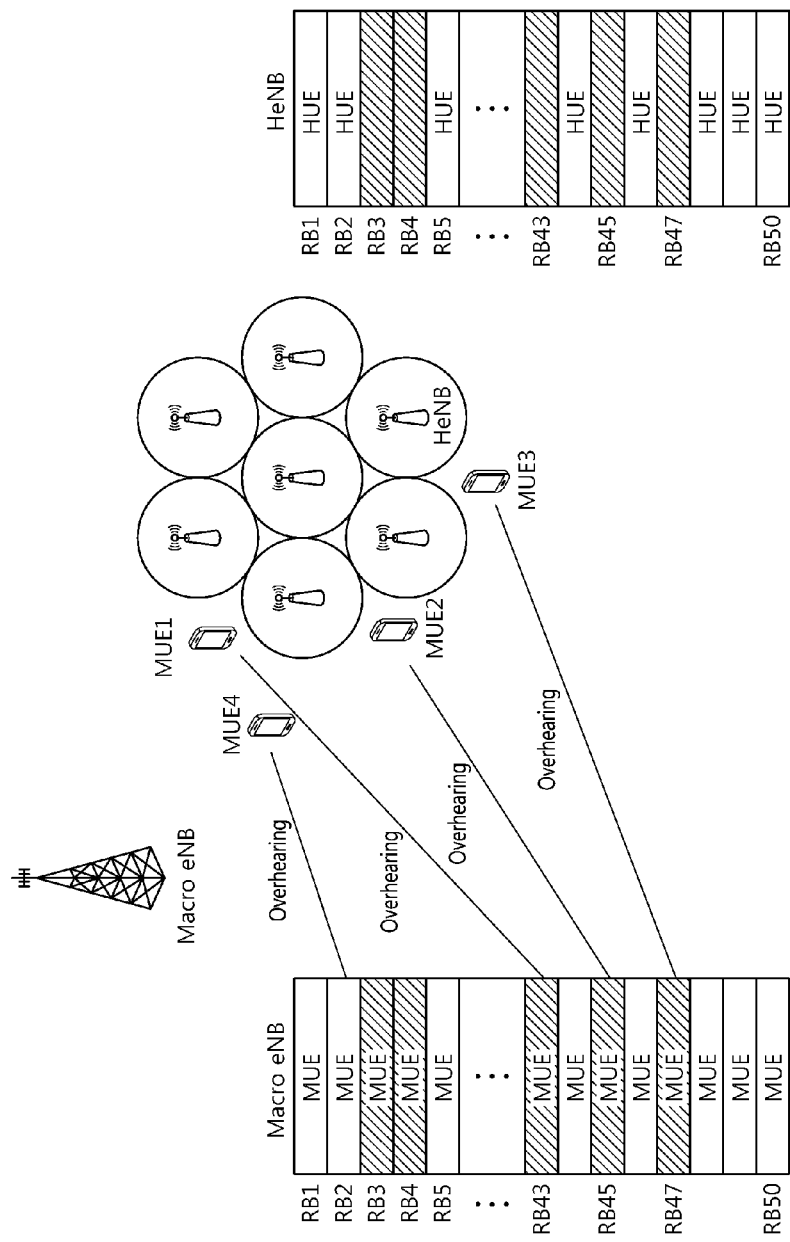
FIG. 11 illustrates an example of resource allocation according to the embodiment of FIG. 6.

FIG. 11 illustrates an example of resource allocation according to the embodiment of FIG. 6. As described above, the CCN overhears the PDCCH which is transmitted from the macro eNB to the MUE, and transmits the interference candidate resource to the macro eNB and/or the HeNB. Based on this, the macro eNB and/or the HeNB perform(s) the resource allocation.

Referring to FIG. 11, since the ICI may occur at R={RB3, RB4, RB43, RB45, RB47}, the CCN determine the R={RB3, RB4, RB43, RB45, RB47} to be the interference candidate resource, and transmits the information of this to the macro eNB and/or the HeNB.

The macro eNB and/or the HeNB perform(s) the resource allocation based on the information. For example, the macro eNB may perform the dynamic resource allocation with the resource candidate resource being included, and the HeNB may perform dynamic resource allocation without the interference candidate resource. In this time, the macro eNB may fixedly allocate the interference candidate resource to the MUE in which the ICI may occur.

Figure 12:
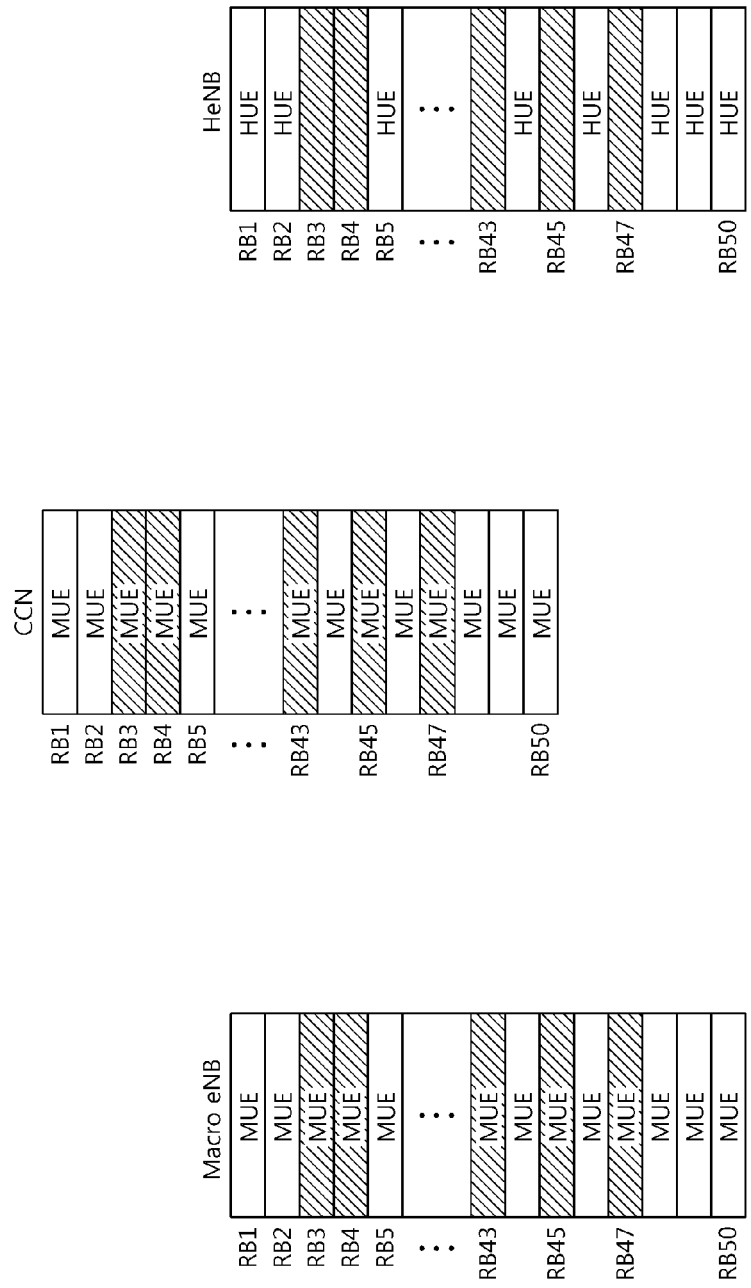
FIG. 12 illustrates an example of resource allocation according to the embodiment of FIG. 8.

FIG. 12 illustrates an example of resource allocation according to the embodiment of FIG. 8. As described above, the CCN overhears the PUCCH which is transmitted from the MUE to the macro eNB, and transmits the interference candidate resource to the macro eNB and/or the HeNB. Based on this, the macro eNB and/or the HeNB perform(s) the resource allocation.

Referring to FIG. 11, since the ICI may occur at R={RB3, RB4, RB43, RB45, RB47}, the CCN determine the R={RB3, RB4, RB43, RB45, RB47} to be the interference candidate resource, and transmits the information of this to the macro eNB and/or the HeNB.

The macro eNB and/or the HeNB perform(s) the resource allocation based on the information. For example, the macro eNB may perform the dynamic resource allocation with the resource candidate resource being included, and the HeNB may perform dynamic resource allocation without the interference candidate resource.

Figure 13:
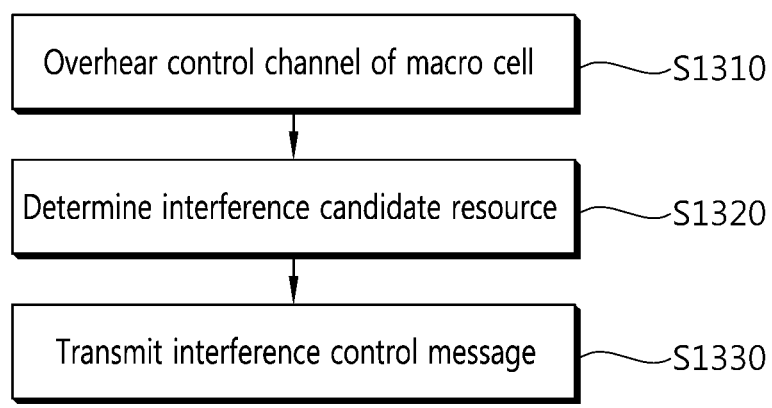
FIG. 13 illustrates an example of method for controlling the ICI in the HetNet system according to the present invention.

FIG. 13 illustrates an example of method for controlling the ICI in the HetNet system according to the present invention.

A CCN overhears the control channel of a macro cell (step, S1310). As described above, the control channel may be the PDCCH transmitted from a macro eNB to a MUE or the PUCCH transmitted from the MUE to the macro eNB.

The CCN determine the resource in which the ICI may occur based on the control channel (step, S1320).

In case of overhearing the PDCCH, the CCN may acquire the information of the uplink and downlink resources of the MUE. The CCN may determine the MUE in which the ICI may occur among the resources through Equation 1, and determine the resource allocated to the corresponding MUE as an interference candidate resource.

In case of overhearing the PUCCH, the CCN may acquire the information of downlink channel state of the corresponding MUE. The CCN may determine the resource in which the downlink channel state is not good to be the interference candidate resource.

The CCN transmits the interference control message to the macro eNB and/or the HeNB (step, S1330).

The interference control message may include the information of the interference candidate resource in which the ICI may occur, and instruct the opposition/prohibition command for the corresponding resource.

Figure 14:
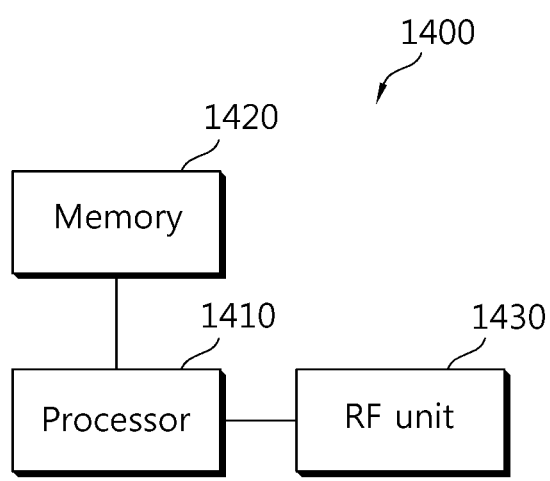
FIG. 14 is a block diagram illustrating the cluster coordinator node (CCN) in which an embodiment of the present invention can be implemented.

FIG. 14 is a block diagram illustrating the cluster coordinator node (CCN) in which an embodiment of the present invention can be implemented.

The CCN 1400 includes a processor 1410, a memory 1420 and a RF unit 1430. The processor 1310 implements the proposed functions, processes and/or methods. The memory 1420 stores various data for driving the processor 1410 with being connected to the processor 1410. The RF unit 1430 transmits and/or receives the radio signal with being connected to the processor 1410.

The processor 1410 implements the suggested function, process and/or method. In the embodiments of FIG. 5 to FIG. 13, the operation of CCN may be implemented by the processor 1410.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for controlling inter-cell interference in a heterogeneous network (HetNet) system including a macro cell and a femto cell, the method comprising:
   overhearing, by a cluster coordinator node (CCN), a control channel of the macro cell;
   determining, by the CCN, an interference candidate resource for controlling the inter-cell interference based on the control channel; and
   transmitting, by the CCN, an interference control message that includes information of the interference candidate resource,
   wherein the control channel is either a physical downlink control channel (PDCCH) transmitted from a macro cell to a user equipment (UE) or a physical uplink control channel (PUCCH) transmitted from the UE to the macro cell,
   wherein if the CCN overhears the PUCCH of the macro cell, the interference candidate resource is determined based on a downlink channel state of the UE, and
   wherein if the CCN overhears the PDCCH of the macro cell, the interference candidate resource is determined based on a power of an uplink signal of the UE and a predetermined threshold value.

2. The method of claim 1, further comprising:
   determining an interference candidate UE among a plurality of UEs which are located in the femto cell,
   wherein the interference candidate resource is allocated to the interference candidate UE.

3. The method of claim 2, wherein transmission power transmitted from the interference candidate UE is greater than the predetermined threshold value.

4. An apparatus for controlling inter-cell interference in a heterogeneous network (HetNet) system including a macro cell and a femto cell, the apparatus comprising:
   a radio frequency (RF) unit configured to transmit and receive a radio signal; and
   a processor operatively coupled with the RF unit and configured to:
   overhear, by a cluster coordinator node (CCN), a control channel of the macro cell;
   determine an interference candidate resource for controlling the inter-cell interference based on the control channel; and
   transmit an interference control message that includes information of the interference candidate resource,
   wherein the control channel is either a physical downlink control channel (PDCCH) transmitted from the macro cell to a user equipment (UE) or a physical uplink control channel (PUCCH) transmitted from the UE to the macro cell,
   wherein if the CCN overhears the PUCCH of the macro cell, the interference candidate resource is determined based on a downlink channel state of the UE, and
   wherein if the CCN overhears the PDCCH of the macro cell, the interference candidate resource is determined based on a power of an uplink signal of the UE and a predetermined threshold value.

5. The apparatus of claim 4, wherein the processor is further configured to determine an interference candidate UE among a plurality of UEs which are located in the femto cell,
   wherein the interference candidate resource is allocated to the interference candidate UE.

6. The apparatus of claim 5, wherein transmission power transmitted from the interference candidate UE is greater than the predetermined threshold value.

* * * * *